US012774939B2

(12) United States Patent
Dupe et al.

(10) Patent No.: US 12,774,939 B2
(45) Date of Patent: Oct. 27, 2026

(54) ANTISTATIC PRESSURE MEASURING RAKE, IN PARTICULAR FOR AN ENGINE OF AN AIRCRAFT, AND MORE PARTICULARLY FOR A BYPASS TURBOJET ENGINE

(71) Applicant: Airbus Operations SAS, Toulouse (FR)

(72) Inventors: Nicolas Dupe, Toulouse (FR); Nicolas Jean, Toulouse (FR); Thomas Boisson, Toulouse (FR); Cyrille Dajean, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 290 days.

(21) Appl. No.: 18/442,497

(22) Filed: Feb. 15, 2024

(65) Prior Publication Data

US 2024/0280439 A1 Aug. 22, 2024

(30) Foreign Application Priority Data

Feb. 17, 2023 (FR) .................................. FR2301497

(51) Int. Cl.
*G01M 15/14* (2006.01)
*B64D 45/00* (2006.01)
(Continued)

(52) U.S. Cl.
CPC ............. *G01M 15/14* (2013.01); *B64D 45/00* (2013.01); *B64F 5/60* (2017.01); *F01D 21/003* (2013.01);
(Continued)

(58) Field of Classification Search
CPC ......... G01M 15/14; G01M 15/00; B64F 5/60; B64D 45/00; F01D 25/285; F05B 2260/80
(Continued)

(56) References Cited

U.S. PATENT DOCUMENTS 4,976,466 A * 12/1990 Vauchel .................... F02K 1/70 239/265.41
5,267,438 A * 12/1993 Bunel ....................... F02K 1/70 239/265.29
(Continued)

FOREIGN PATENT DOCUMENTS

CN 103765183 B * 9/2015 ........... G01L 9/0052
CN 111323162 A * 6/2020 ......... G01L 19/0061
(Continued)

OTHER PUBLICATIONS

NASA, In-flight Investigation of a RTotating Cylinder-Based Structural Excitation System for Flutter Testing, NASA Technical Memorandum 4512, Jun. 1993, p. 26 (Year: 1993).*
(Continued)

*Primary Examiner* — Stephanie E Bloss
*Assistant Examiner* — Kevin C Butler
(74) *Attorney, Agent, or Firm* — Greer, Burns & Crain, Ltd.

(57) ABSTRACT

A pressure measuring rake, intended for arrangement on a link rod, includes at least: a sheath including two side walls which between them delimit a recess configured to receive the link rod, and an electronic circuit arranged on the sheath and including at least one sensor, the measuring rake additionally including at least one conductive layer at least partially covering the sheath and a conductive strip, the conductive layer and the conductive strip being configured to be electrically connected to at least one conductive element configured to drain off charges that are liable to build up on the conductive layer, the measuring rake making it possible to avoid the build-up of electrostatic charges liable to disrupt measurements taken by the sensors and/or electrical communications between the sensors and a data processing unit.

10 Claims, 4 Drawing Sheets

(51) Int. Cl.
*B64F 5/60* (2017.01)
*F01D 21/00* (2006.01)
*F01D 25/28* (2006.01)
*G01M 15/00* (2006.01)

(52) U.S. Cl.
CPC ........ *F01D 25/285* (2013.01); *F05B 2260/80* (2013.01); *G01M 15/00* (2013.01)

(58) Field of Classification Search
USPC ........................................................ 73/112.01
See application file for complete search history.

(56) References Cited

U.S. PATENT DOCUMENTS

| | | | | | |
|---|---|---|---|---|---|
| 5,332,644 | A * | 7/1994 | McNamara | G03G 5/055 430/133 |
| 5,478,676 | A * | 12/1995 | Turi | H01M 4/667 429/234 |
| 5,548,954 | A * | 8/1996 | de Cambray | F02K 1/70 239/265.29 |
| 5,899,059 | A * | 5/1999 | Gonidec | F02K 1/70 244/110 B |
| 6,009,702 | A * | 1/2000 | Gonidec | F02K 1/70 244/110 B |
| 6,595,062 | B1 * | 7/2003 | Luke | G01L 19/0092 73/714 |
| 7,608,342 | B2 * | 10/2009 | Zhong | H01B 1/127 427/372.2 |
| 8,415,943 | B2 * | 4/2013 | Dijkstra | G01R 29/0878 324/156 |
| 8,578,698 | B2 * | 11/2013 | Vauchel | F02K 1/72 244/110 B |
| 8,745,966 | B2 * | 6/2014 | Metezeau | F02K 1/72 60/226.2 |
| 8,831,900 | B2 * | 9/2014 | Maalioune | G05B 23/0256 702/108 |
| 9,835,112 | B2 * | 12/2017 | Calder | B33Y 80/00 |
| 10,138,754 | B2 * | 11/2018 | Giordan | G01P 5/165 |
| 10,159,440 | B2 * | 12/2018 | Longinotti-Buitoni | A61B 5/02055 |
| 10,619,598 | B2 * | 4/2020 | Segat | B64D 33/06 |
| 10,669,970 | B2 * | 6/2020 | Pautis | F02K 1/70 |
| 11,099,096 | B2 * | 8/2021 | Caturla | F02K 1/64 |
| 2011/0030338 | A1 * | 2/2011 | Vauchel | F02K 1/1261 60/226.2 |
| 2011/0266366 | A1 * | 11/2011 | Hogie | F16F 1/187 239/265.19 |
| 2014/0037430 | A1 * | 2/2014 | Thorpe | G01K 13/028 415/118 |
| 2014/0137541 | A1 * | 5/2014 | Caruel | F02K 1/72 239/265.19 |
| 2015/0226157 | A1 * | 8/2015 | Calder | F02K 1/72 60/228 |
| 2018/0340444 | A1 * | 11/2018 | Jausovec | F01D 9/041 |
| 2019/0289842 | A1 * | 9/2019 | Lopac | A01M 29/12 |
| 2020/0191676 | A1 * | 6/2020 | Caturla | G01L 19/147 |
| 2022/0228540 | A1 * | 7/2022 | Lescoup | B64D 29/08 |
| 2023/0029052 | A1 * | 1/2023 | Valleroy | F02K 1/625 |
| 2023/0134390 | A1 * | 5/2023 | Le Pape | F02C 7/32 415/118 |
| 2024/0124148 | A1 * | 4/2024 | Chelin | F02K 1/827 |
| 2024/0227360 | A9 * | 7/2024 | Murillo | B32B 38/0004 |
| 2024/0280428 | A1 * | 8/2024 | Dupe | F02K 1/763 |
| 2024/0280429 | A1 * | 8/2024 | Allard | G01L 19/147 |
| 2025/0376963 | A1 * | 12/2025 | Gonidec | F02K 1/72 |

FOREIGN PATENT DOCUMENTS

| | | | | |
|---|---|---|---|---|
| EP | 3671166 | A1 * | 6/2020 | G01L 19/0061 |
| EP | 4417956 | A1 * | 8/2024 | G01L 19/0061 |
| FR | 2929998 | A1 * | 10/2009 | F02K 1/72 |
| FR | 3043775 | A1 * | 5/2017 | G01L 15/00 |
| FR | 3066779 | A1 * | 11/2018 | F01D 9/041 |
| FR | 3090102 | A1 * | 6/2020 | G01L 19/0061 |
| JP | H1071998 | A * | 3/1998 | F02K 1/70 |
| WO | WO-2017187108 | A1 * | 11/2017 | G01M 15/14 |

OTHER PUBLICATIONS

Petersen et aql., Boundary Layer Analysis of a Transonic High-Pressure Turbine Vane Using Ultra-Fast-Response Temperature-Sensitive Paint, Proceedings of ASME Turbo Expo 2023 Turbomachinery Technical Conference and Exposition, Jun. 26-30, 2023, Boston, Massachusetts, USA, p. 12 (Year: 2023).*

French Search Report and Written Opinion for corresponding French Patent Application No. 2301497 dated Aug. 31, 2023.

Anonymous “Kaltbrunner AG—Ihr Kompetenter Partner Fur Hochwertige Beschichtungen” retrieved on Aug. 31, 2023 from http://web.archive.org/web/20230129013922/http://kaltbrunner.ch/de.

* cited by examiner

ANTISTATIC PRESSURE MEASURING RAKE, IN PARTICULAR FOR AN ENGINE OF AN AIRCRAFT, AND MORE PARTICULARLY FOR A BYPASS TURBOJET ENGINE

CROSS-REFERENCES TO RELATED APPLICATIONS

This application claims the benefit of the French patent application No. 2301497 filed on Feb. 17, 2023, the entire disclosures of which are incorporated herein by way of reference.

FIELD OF THE INVENTION

The present invention relates to an antistatic pressure measuring rake, in particular for an engine of an aircraft, and more particularly for a bypass turbojet engine.

BACKGROUND OF THE INVENTION

During some design or maintenance phases for an aircraft, the engines of the aircraft, notably the turbojet engines, are likely to be tested. These tests require measurements to be taken, on the ground and/or in flight, at various locations of the engine that are to be tested. This taking of measurements involves instrumentation of the engine, in particular inside a secondary duct. To this end, for example, document FR 3 090 102 A1 discloses measuring tools for taking pressure measurements in an aircraft engine.

These measuring tools are disposed in air flow circulation zones and they are therefore subjected to frictional forces that may generate electrostatic charges. However, the measuring tools are generally made from insulating materials, in particular to avoid the infiltration of moisture which would run the risk of freezing at high altitude and adversely affecting the measuring tool. Such measuring tools do not make it possible to dissipate the electrostatic charges, which therefore build up on the surfaces of the measuring tool. Above a certain limit, these electrostatic charges can dissipate suddenly, creating an electrical discharge which is liable to disrupt the electronic communications and measurements.

The existing measuring tools are therefore not entirely satisfactory.

SUMMARY OF THE INVENTION

An aim of the present invention is to rectify the above-mentioned drawbacks. This aim relates to an antistatic pressure measuring rake, in particular for an engine of an aircraft, and more particularly for a bypass turbojet engine.

According to the invention, the pressure measuring rake is intended for arrangement on a link rod, the measuring rake comprising at least:

- a sheath comprising two side walls which between them delimit a recess configured to receive the link rod; and
- an electronic circuit arranged on the sheath and comprising at least one pressure sensor, the measuring rake additionally comprising at least one conductive layer at least partially covering the sheath, the conductive layer being configured to electrically connect to at least one conductive element configured to drain off charges that are liable to build up on the conductive layer.

As a result, the measuring rake provides a simple and inexpensive measuring tool which does not build up electrostatic charges, in particular when subjected to a flow of air, and which therefore makes it possible to avoid the problems caused by electrostatic charges, notably disruptions to the measurements taken by the sensors and/or disruptions to the electrical communications between the sensors and a data processing unit.

The conductive layer preferably corresponds to a conductive paint layer painted on at least some of the sheath.

Moreover, the conductive layer comprises at least one antistatic agent on the basis of one of the following chemical elements: copper, carbon, nickel, silver, silicates, indium.

Advantageously, the measuring rake additionally comprises at least one conductive strip configured to electrically connect the conductive layer at all times to at least one conductive element.

In a particular embodiment, the conductive strip has a fixing end fixed in the recess of the sheath in contact with the conductive layer and a free end protruding from the recess at one longitudinal end of the sheath, the free end being intended to electrically connect the conductive layer at all times to at least one conductive element by being pressed against the conductive element at all times.

Advantageously, the conductive strip has a stiffness and an arrangement intended to generate an elastic force against the conductive element at the free end at all times, the elastic force being able to keep the free end in contact with the conductive element so as to electrically connect the conductive layer at all times to the conductive element.

Furthermore, in a particular embodiment, the measuring rake additionally comprises a patched leading edge removably fixed to the sheath via a counter-plate arranged in the recess, the patched leading edge and the counter-plate being arranged on either side of a front wall of the sheath and fixed to the sheath together so as to be both electrically connected to the conductive layer, the conductive strip being fixed, at its fixing end, to the counter-plate.

Moreover, the measuring rake comprises at least one data processing unit configured to receive data measured by the sensors of the electronic circuit, the data processing unit being arranged on the sheath or separate.

The present invention also relates to an engine for an aircraft. According to the invention, the engine comprises a secondary duct and at least one movable reverser door, the reverser door comprising at least one link rod fixed in articulated fashion between the reverser door and a motor, the link rod being configured to make it possible to bring the reverser door into a retracted position, in which it is not across the secondary duct, and into a deployed position, in which it is across the secondary duct, the engine comprising at least one measuring rake as described above arranged on at least one link rod of the engine, the one or more link rods each being accommodated in the recess of at least one measuring rake.

The present invention also relates to an aircraft comprising at least one engine as described above.

BRIEF DESCRIPTION OF THE DRAWINGS

The appended figures will make it easy to understand how the invention may be implemented. In these figures, identical reference signs designate similar elements.

DETAILED DESCRIPTION OF THE PREFERRED EMBODIMENTS

Figure 1:
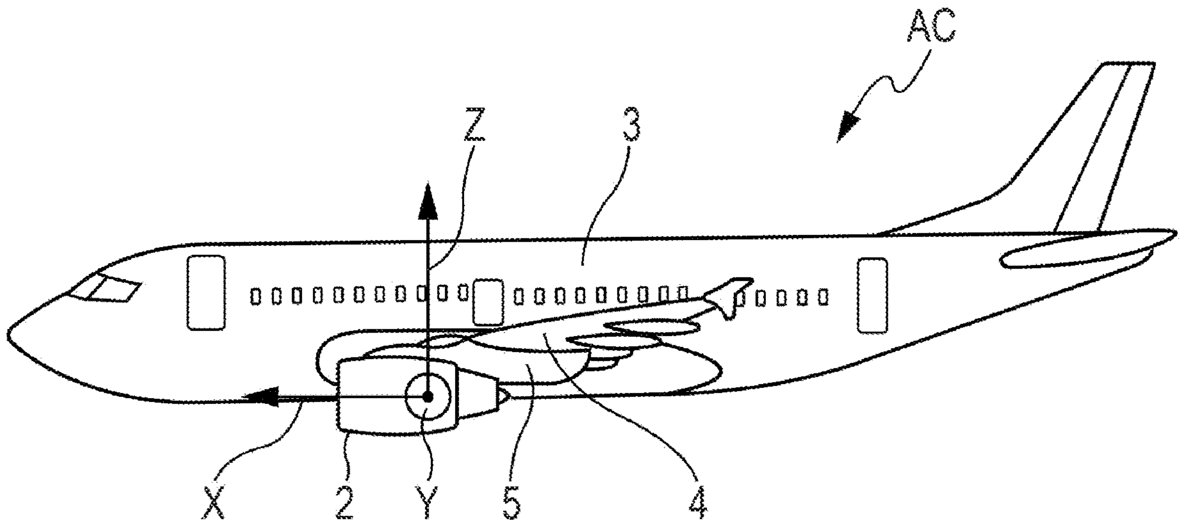
FIG. 1 is a side view of an aircraft according to the invention.
Figure 2:
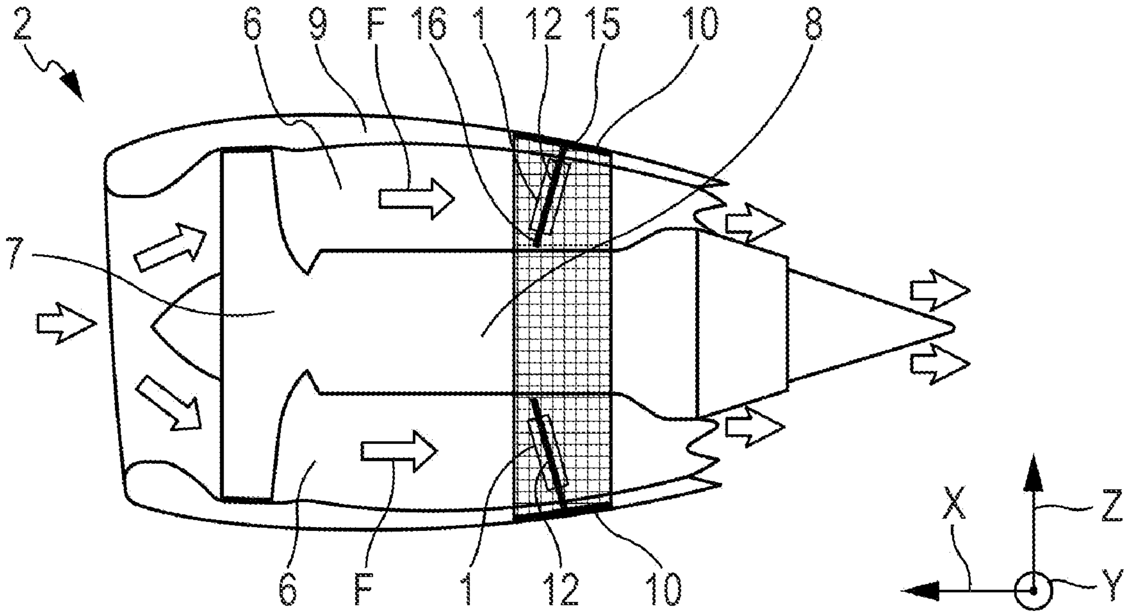
FIG. 2 is a side view, in section, of an engine according to the invention comprising reverser doors in a retracted position.
Figure 3:
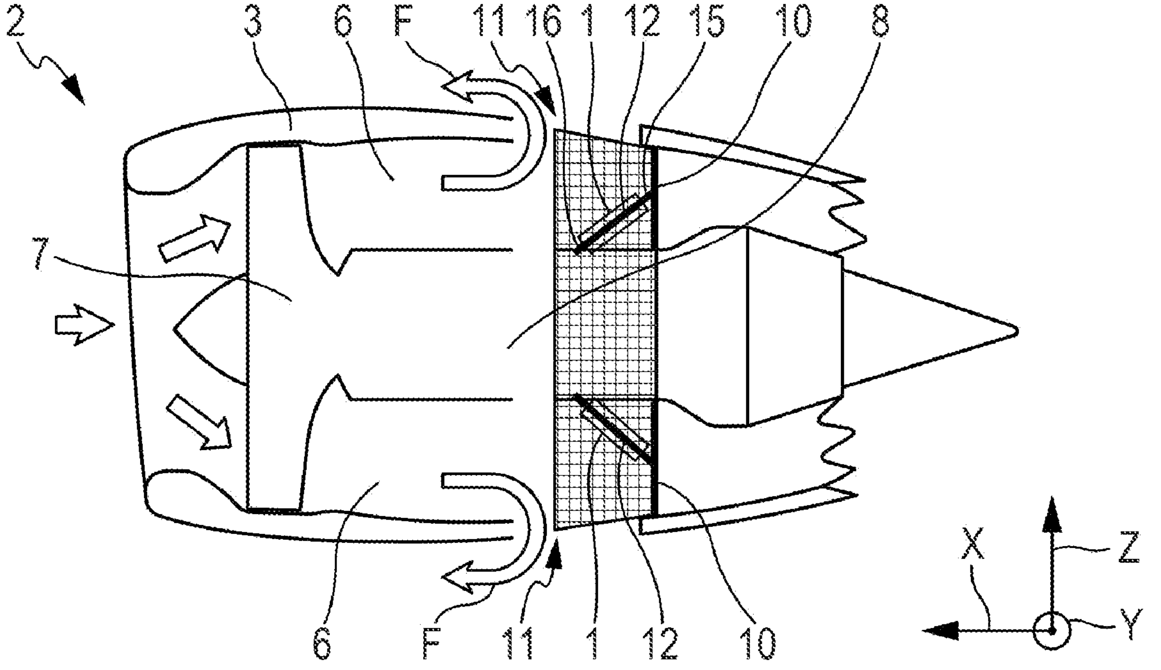
FIG. 3 is a side view, in section, of an engine according to the invention comprising reverser doors in a deployed position.

The pressure measuring rake 1 (hereinafter measuring rake 1), which makes it possible to illustrate the invention, is shown in particular embodiments in FIG. 2 to FIG. 6. It corresponds to a measuring tool for taking aerodynamic measurements, notably pressure measurements. The measuring rake 1 is particularly, but not exclusively, suitable for use on an aircraft AC, shown in FIG. 1. It makes it possible to take measurements within the scope of tests on the ground and/or in flight. The measuring rake 1 is preferably arranged in a duct of an engine 2 of the aircraft AC, as shown in FIG. 2 and FIG. 3.

The aircraft AC comprises a fuselage 3 on each side of which is fixed a wing 4 bearing an engine 2 fixed to a pylon 5 located underneath the wing 4. In the preferred embodiment described in the present description, the engine 2 corresponds to a bypass turbojet engine and the measuring rake 1 is configured to take pressure measurements in a secondary duct 6 of the engine 2. However, the invention is not restricted to such an engine and the measuring rake 1 may be used in a wide variety of different situations in which the pressure of a flow of air must be measured.

In the following text, reference will be made to an orthogonal reference system (X, Y, Z) such that:

- X is the longitudinal axis of the engine 2, which is parallel to the longitudinal axis of the aircraft AC and oriented positively towards the front of the aircraft AC;
- Y is the axis transverse to the engine and perpendicular to the axis X; and
- Z is the axis perpendicular to the axis X and the axis Y.

As shown in FIG. 2 and FIG. 3, the engine 2 comprises a fan 7, a motor 8 forming a core, and a nacelle 9 disposed around the motor 8. The secondary duct 6 is delimited between the motor 8 and the nacelle 9. The air enters through the fan 7 and then is divided into a primary flow which passes through the motor 8 and a secondary flow which passes through the secondary duct 6, as shown by arrows F in FIG. 2 and FIG. 3.

The engine 2 also comprises a thrust reversal system which comprises reverser doors 10. These reverser doors 10 are mounted rotatably about an axis substantially perpendicular to the axis X, that is, parallel to the axis Y. They may be brought into a retracted position (FIG. 2), corresponding to a configuration in which the engine 2 is in thrust mode, and into a deployed position (FIG. 3), corresponding to a configuration in which the engine 2 is in counter-thrust mode. In the retracted position, the reverser doors 10 are comprised in the walls of the nacelle 9, they are not across the secondary duct 6, and they therefore do not obstruct the passage of the secondary flow of air. In the deployed position, the reverser doors 10 extend from the motor 8 to the walls of the nacelle 9, they are across the secondary duct 6, and they therefore obstruct the passage of the secondary flow of air. In addition, in this deployed position, the reverser doors 10 open windows 11 which communicate with the outside of the nacelle 9 and allow the secondary flow of air to be deflected through the windows 11.

Moreover, the engine 2 comprises a link rod 12 arranged on each reverser door 10. Each link rod 12 comprises a body 14 (FIG. 6) provided with an elongate shape extending between the motor 8 and the reverser door 10 on which it is arranged. In addition, a longitudinal end 15 of each link rod 12 is fixed in articulated fashion to the reverser door 10 and another longitudinal end 16 of each link rod 12 is fixed to the motor 8. In addition, the body 14 of each link rod 12 has an aerodynamic cross section around which the secondary flow of air of the secondary duct 6 flows.

The engine 2 also comprises conventional displacement elements (rams, slides, etc.) for bringing the reverser doors 10 into the retracted position and into the deployed position via the link rods 12.

In the deployed position, the link rods 12 are across the secondary duct 6, that is, they are oriented such that their longitudinal direction is substantially incident on the secondary flow of air. Conversely, in the retracted position, the link rods 12 are not across the secondary duct 6, that is, they are oriented such that their longitudinal direction is substantially in the direction of the secondary flow of air.

In a preferred embodiment, shown in FIG. 2 to FIG. 6, the measuring rake 1 is arranged on a link rod 12 of the engine 2, but in other embodiments it may be configured for arrangement on another element of the engine 2 or the aircraft AC.

In this embodiment, the measuring rake 1 is configured to make it possible to take measurements of the pressure of the secondary flow of air in the secondary duct 6, in particular, when the reverser door 10 is in the retracted position. In this configuration, the measuring rake 1 is subjected to friction from the flow of air that is liable to generate electrostatic charges on the outer surfaces of the measuring rake 1.

Figure 4:
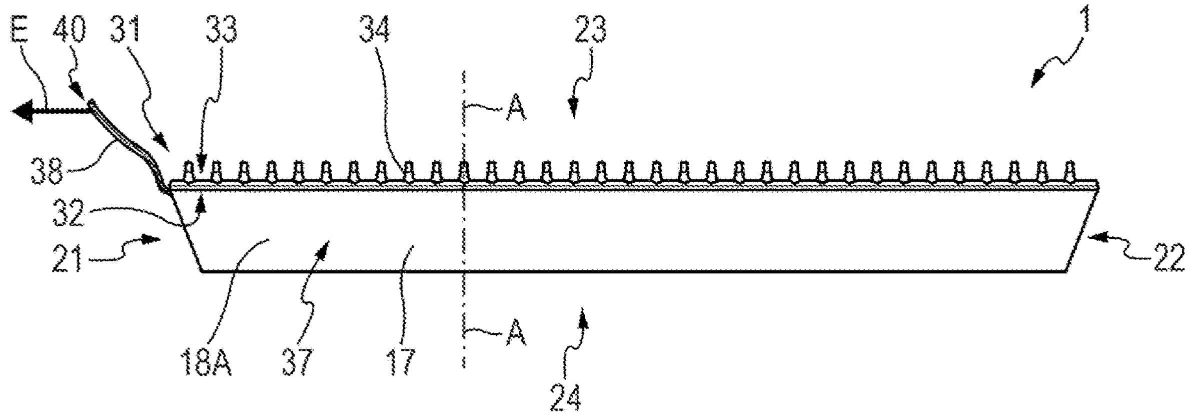
FIG. 4 is a side view of a measuring rake according to a particular embodiment of the invention.
Figure 5:
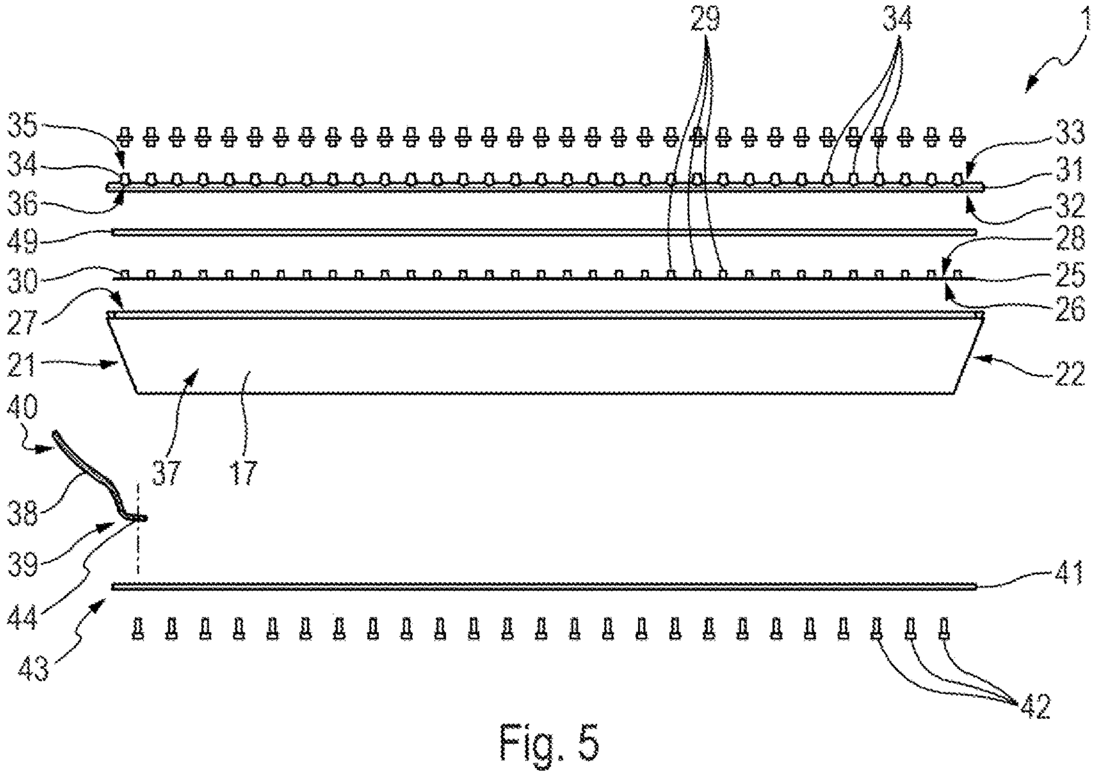
FIG. 5 is an exploded view of the measuring rake of FIG. 4.
Figure 6:
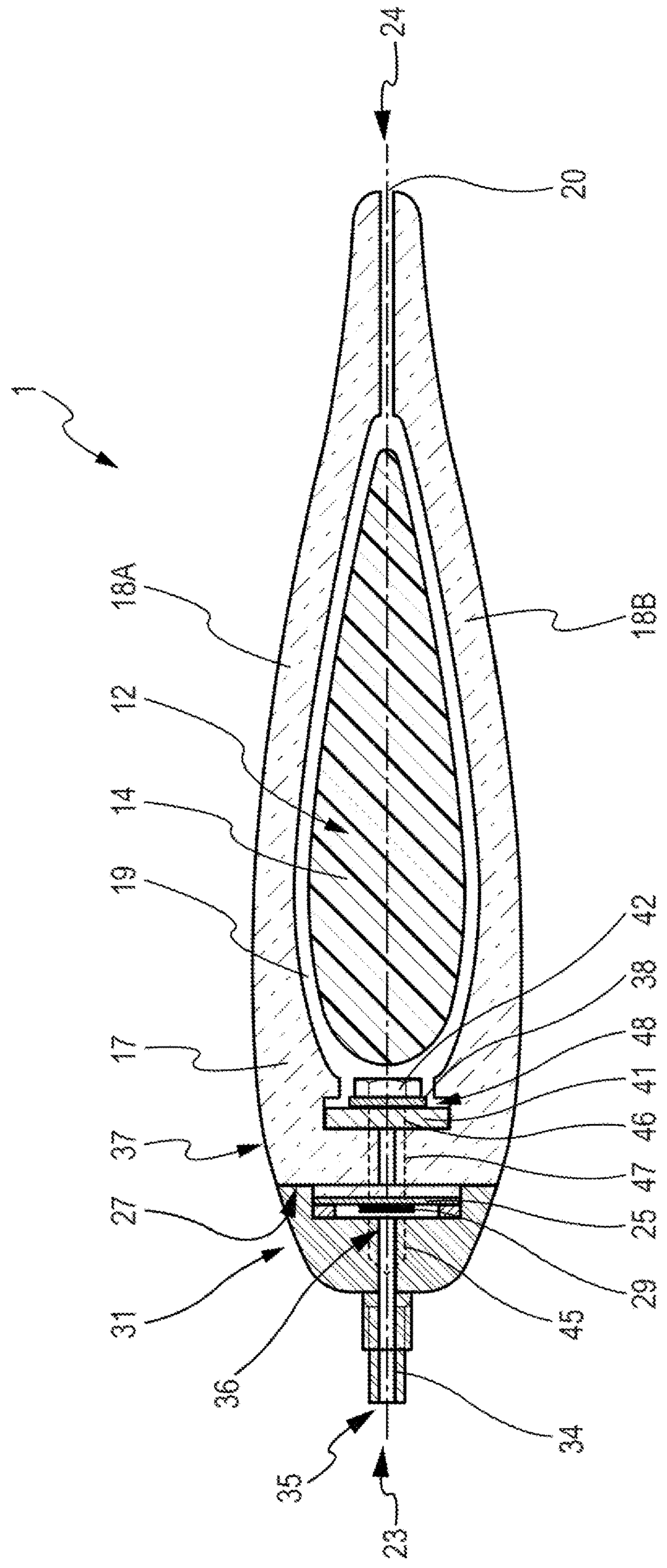
FIG. 6 is a sectional view through a sectional plane A-A of the measuring rake of FIG. 4.

The measuring rake 1 is particular in that it comprises a conductive layer 37, shown schematically in FIG. 4 to FIG. 6, which is able to conduct electrostatic charges that are liable to be generated and build up on the surfaces of the measuring rake 1. Thus, the conductive layer 37 makes it possible to drain off these electrostatic charges via an external element, as described in more detail later on in the description.

The measuring rake 1, shown in FIG. 4 to FIG. 6, is a measuring tool comprising multiple elements which are assembled and fixed together "in sandwiched fashion", as illustrated in the exploded view of FIG. 5. This arrangement of these elements is described in more detail in the rest of the description.

The measuring rake 1 notably comprises a sheath 17 which is disposed and fixed on the body 14 of the link rod 12 that is to be instrumented. This sheath 17 has an elongate shape and an aerodynamic profile, for example a biconvex profile. The sheath 17 is preferably made by three-dimensional printing from a polymer-type material, for example polyamide.

The measuring rake 1 has a length that is able to at least partially cover all of the link rod 12. Non-limitingly, in the example in question of application to an aircraft engine, the measuring rake 1 typically has a length of between 50 cm and 1 m, in particular, a length of 80 cm.

As shown in a sectional view in FIG. 6, the sheath 17 comprises two side walls 18A and 18B which between them delimit a recess 19 configured to receive the body 14 of the link rod 12. In addition, the recess 19 communicates with the outside of the sheath 17 by way of a slot 20 that extends over the length of the sheath 17 between the side walls 18A and 18B. They thus form a clamp for tightly surrounding the body 14 of the link rod 12. Moreover, the sheath 17 is open at longitudinal ends 21 and 22, this allowing the longitudinal ends 15 and 16 of the link rod 12 to project beyond the sheath 17 in order to be fixed to the motor 8 and the reverser door 10, respectively.

The slot 20 is narrower than the thickness of the body 14 of the link rod 12 and the introduction of the link rod 12 therefore requires elastic spreading of the side walls 18A and 18B in order to install the measuring rake 1 on the link rod 12. Elastic retightening of the side walls 18A and 18B over the body 14 of the link rod 12, when the latter is in the recess 19, makes it possible to hold the measuring rake 1 in place without needing to provide additional elements. The body 14 may, however, have shapes or elements (not shown) to make it easier to position the measuring rake 1 and/or to prevent the movement of the sheath 17 along the link rod 12.

In a particular embodiment, the side walls 18A and 18B may be held mutually tightly against the body 14 of the link rod 12 via a removable fixing means (not shown). For example, they may be screwed, bolted, adhesively bonded or clamped by a clamping collar.

When it is in place on the link rod 12 in the secondary duct 6, the sheath 17 has, with respect to the flow of air in the secondary duct 6, a leading edge 23 oriented towards the front (positively along the axis X) and a trailing edge 24 oriented towards the rear (negatively along the axis X). The sheath 17 is preferably configured such that the slot 20 is located at the trailing edge 24.

Furthermore, as illustrated in FIG. 5 and FIG. 6, the measuring rake 1 comprises an electronic circuit 25 arranged on the sheath 17. This electronic circuit 25 is notably provided with a face 26 arranged on a front face 27 of the sheath 17. The front face 27 corresponds to a surface located on the side of the leading edge 23 which extends over the length of the sheath 17. The electronic circuit 25 is also provided with a face 28, situated opposite the face 26 and thus oriented towards the leading edge 23, on which a plurality of pressure sensors 29 are arranged.

The electronic circuit 25 preferably corresponds to a printed circuit having an elongate shape and it is arranged over the entire length of the front face 27. However, in particular embodiments, it may be another type of electronic circuit extending over all or some of the front face 27. In addition, the sensors 29 are distributed so as to form a line extending over the length of the electronic circuit 25.

The electronic circuit 25 also comprises a data bus for incoming and/or outgoing data communications with the sensors 29, and an electrical power supply. In the preferred embodiment of the present description, the sensors 29 are configured to measure pressure values generated by the secondary flow of air in the secondary duct 6, as specified later on in the description.

The sensors 29 preferably correspond to pressure sensors of the microelectromechanical system type (also referred to as MEMS). However, they may be sensors of another type that can take pressure measurements. By way of non-limiting example, the "MEMS" sensors, which are particularly compact, make it possible to obtain a line of sensors 29 along the electronic circuit 25 with a density of fifty sensors per meter, this representing a sensor every 20 mm. Depending on the applications and/or the measurement precision to be obtained, the density of sensors may vary, for example with a distance between two sensors 29 of between 10 mm and 100 mm.

Moreover, the measuring rake 1 has a data processing unit 30, which is shown schematically in FIG. 5. The data processing unit 30 is connected to the electronic circuit 25 so as to be able to receive data measured by the sensors 29 of the electronic circuit 25. Non-limitingly, the data processing unit 30 may be configured to perform a function of acquiring and transmitting data measured by the sensors 29 and/or a storing function, for example in a memory (not shown). In a particular embodiment, the data processing unit 30 is integrated directly on the measuring rake 1, for example in part of the sheath 17. In other embodiments, the data processing unit 30 may be separate and elsewhere. For example, it may be arranged on part of the engine 2, on or under the reverser door 10.

In one embodiment, or these embodiments, the measuring rake 1 may comprise a base (not shown in the figures) arranged at one end of the sheath 17. The base has a flat shape. The base is configured to protect the data processing unit 30 if the latter is arranged on the measuring rake 1. The base is able to be pressed against the reverser door 10 so as to cover the data processing unit 30 to protect it from the surrounding area.

As shown in FIG. 4 to FIG. 6, the measuring rake 1 also comprises a patched leading edge 31 fixed to the front face 27 of the sheath 17 so as to cover the electronic circuit 25. However, in other embodiments, the measuring rake 1 may have a leading edge directly integrated in the shape of the sheath 17.

The patched leading edge 31 corresponds to a one-piece part fixed removably to the sheath 17, for example using screws. It may be made by machining a metal material. In particular, it is made from an electrically conductive material, preferably aluminum.

The patched leading edge 31 comprises an inner face 32 arranged on the front face 27 of the sheath 17 so as to cover the electronic circuit 25. It also comprises an outer face 33 situated opposite the inner face 32. As illustrated in FIG. 4, the outer face 33 is located towards the leading edge 23 of the sheath 17 and has a rounded shape intended to be incident on the secondary flow of air.

The leading edge 31 additionally comprises a plurality of air intakes 34 distributed over the length of the patched leading edge 31. In the example illustrated in FIG. 4 and FIG. 5, the air intakes 34 are distributed at regular intervals, that is, at the same distance from one another. However, they may also be distributed at irregular intervals. Each air intake 34 forms a fluidic passage between the outer face 33 and the inner face 32. These air intakes 34 have an end 35 which opens out into the secondary duct 6 by way of the outer face 33 and an end 36 which opens out onto the electronic circuit 25 by way of the inner face 32. In particular, each air intake 34 opens out by way of the end 36 facing a sensor 29 of the electronic circuit 25.

Furthermore, as shown in FIG. 5, the measuring rake 1 comprises a seal 49 arranged between the patched leading edge 31 and the electronic circuit 25. The seal 49 is pressed between the inner face 32 of the patched leading edge 31 and the face 28 of the electronic circuit 25 so as to ensure leaktightness at the interface. However, the seal 49 has openings allowing each air intake 34 to open out onto a sensor 29.

The patched leading edge 31 configured in this way allows each sensor 29 to measure a pressure of a flow of air in the secondary duct 6 channeled by a particular air intake

34. However, in particular embodiments, each air intake 34 may open out facing a plurality of sensors 29 so as to take multiple measurements linked to a flow of air channeled by an air intake 34.

In addition, as shown schematically in FIG. 4 to FIG. 6, the measuring rake 1 comprises the conductive layer 37 covering the sheath 17. The conductive layer 37 preferably entirely covers all the surfaces of the sheath 17. However, in other embodiments, the conductive layer 37 may partially cover the surfaces of the sheath 17, for example solely the surfaces that are subjected to the flow of air in the secondary duct 6.

The conductive layer 37 corresponds to a long-lasting coating layer having electrical conduction properties which are also long-lasting. "Long-lasting" is understood to mean that the conductive layer 37 is a layer which does not peel or come off over time, in particular when subjected to a flow of air. Similarly, it should be understood that the conductive layer 37 is a layer which has electrical conduction properties that stay unchanged over time, in particular when subjected to a flow of air.

Moreover, the measuring rake 1 is configured such that the conductive layer 37 is electrically connected at all times to a conductive element configured to drain off charges that are liable to build up on the conductive layer 37. This conductive element preferably corresponds to a conductive element of the engine 2.

This connection is configured to allow the conductive element to discharge, namely electrostatic charges present on the conductive layer 37 can be drained off by the conductive element of the engine 2. For example, the sheath 17 may have a suitable shape that, when the measuring rake 1 is mounted on the link rod 12, allows the sheath 17 to be in contact with the nacelle 9 or the reverser door 10. Since the sheath 17 is covered by the conductive layer 37, this contact makes it possible to obtain an electrical connection able to drain off electrostatic charges.

However, in other embodiments, as described in detail below, the conductive layer 37 may be connected to a conductive element of the engine 2 via other elements.

As a result, the measuring rake 1 provides a simple and inexpensive measuring tool which does not build up electrostatic charges, in particular when subjected to a flow of air. Such a measuring rake 1 thus makes it possible to avoid problems caused by electrostatic discharges. It notably makes it possible to avoid disruptions to measurements taken by the sensors 29 and/or disruptions to electrical communications between the sensors 29 and the data processing unit 30.

In a preferred embodiment, the conductive layer 37 corresponds to a conductive paint layer. It may be a paint comprising a resin in which charged particles have been introduced, for example in the form of a metal powder. It may be antistatic paints used in certain industrial environments or in the naval sector. The sheath 17 may be entirely painted using such a conductive paint, or be painted only on its surfaces that are subjected to the flow of air in the secondary duct 6.

Non-limitingly, the conductive paint composing the conductive layer 37 may comprise antistatic agents on the basis of at least one of the following chemical elements: copper, carbon, nickel, silver, silicates, indium. These chemical elements may notably be in the form of oxides.

Furthermore, in a particular embodiment shown in FIG. 4 and FIG. 5, the measuring rake also comprises a conductive strip 38. It is configured to electrically connect the conductive layer 37 at all times to a conductive element of the engine 2. For example, the conductive strip 38 may be configured so as to be in contact both with the conductive layer 37 and with the nacelle 9 or the reverser door 10 of the engine 2 when the measuring rake 1 is installed on the link rod 12. In this way, a connection with a conductive element of the engine 2 that makes it possible to drain off the electrostatic charges that may be generated on the conductive layer 37 is ensured at all times via a dedicated element, specifically the conductive strip 38.

The conductive strip 38 is made from an electrically conductive metal material, preferably aluminum. It has a shape, and notably a thickness, which allow it to be stiff enough to ensure contact at all times without being removed by an external element, for example by the flow of air in the secondary duct 6. Depending on the material, the necessary thickness can vary. By way of non-limiting example, for a strip made of aluminum, an appropriate thickness may be at least 1 mm.

In addition, the conductive strip 38 may have varied shapes suitable for numerous configurations. Moreover, it can be dismounted easily, and it is also possible to provide a plurality of conductive strips 38 from which that having a shape suitable for a given configuration is chosen. For example, it is possible to provide conductive strips 38 with a greater or lesser length along which the measuring rake is to be connected to a conductive element which is more or less far away from the latter.

In a preferred implementation of this embodiment, shown in FIG. 5 to FIG. 6, the conductive strip 38 has a fixing end 39 fixed in the recess 19 in the sheath 17. This fixation is configured to obtain electrically conductive contact between the conductive strip 38 and the conductive layer 37. The conductive strip 38 also has a free end 40 protruding from the recess 19 at the longitudinal end 21 of the sheath 17. This free end 40 is configured to be pressed against a conductive element of the engine 2 at all times when the measuring rake 1 is installed on the link rod 12.

More particularly, the conductive strip 38 is configured to have a stiffness and an arrangement (in relation to that part of the engine 2 against which it should be pressed) that are able to generate an elastic force at the free end 40 against the conductive element of the engine 2 to which it is to be electrically connected. This elastic force, shown schematically in FIG. 4 by an arrow E, is able to keep the free end 40 in contact with the conductive element of the engine 2 at all times when the measuring rake 1 is installed on the link rod 12.

Furthermore, in the particular embodiment described above in which the measuring rake 1 has a base (not shown), the base may be arranged at the longitudinal end 21 of the sheath 17. The base is configured to ensure the conductive strip 38 is pressed against an element of the engine 2. When the measuring rake 1 is arranged on the link rod 12, the conductive strip 38 is located between the element of the engine 2 (for example the reverser door 10) and the base.

In a particular embodiment, illustrated in FIG. 5 and FIG. 6, the measuring rake 1 has the patched leading edge 31 as described above in the present description. The latter is fixed removably to the sheath 17 via a counter-plate 41 arranged in the recess 19 in the sheath 17. As shown in FIG. 6, the counter-plate 41 is preferably slid in a T-shaped groove 48, this holding it mechanically in place in the sheath 17 and allowing access for inserting the screws 42.

For the fixing of the patched leading edge 31, the counter-plate 41 and the sheath 17 are provided with through-holes 46 and 47, respectively, intended to be aligned with one another. Screws 42 are disposed in these through-holes 46 and 47 so as to project from the side of the front face 27 of the sheath 17. Moreover, the patched leading edge 31 has tapped holes 45 in which the screws 42 are able to be screwed. As a result, the screws 42 make it possible to fix the patched leading edge 31 to the sheath 17 by pressing it against the front face 27.

In this particular embodiment, the counter-plate 41 extends over the entire length of the sheath such that the conductive strip 38 can be fixed at one of these ends. More specifically, the fixing end 39 of the conductive strip 38 is arranged against one end 43 of the counter-plate 41 located at the longitudinal end 21 of the sheath 17. The fixing end 39 has a hole 44, shown schematically in FIG. 5, for fixing the conductive strip 38 to the counter-plate 41 using a screw 42.

The counter-plate 41 is pressed in the recess 19 in the sheath 17, which is covered by the conductive layer 37. As it is made from an electrically conductive metal material, it makes it possible to electrically connect the conductive layer 37 to the conductive strip 38.

Furthermore, in this configuration, the patched leading edge 31 is also pressed against the front face 27 of the sheath 17, which is covered by the conductive layer 37. Consequently, electrostatic charges generated by the flow of air in the secondary duct 6 on the patched leading edge 31 can be drained off via the conductive layer 37, via the counter-plate 41 and via the conductive strip 38, by the conductive element of the engine 2 to which the measuring rake 1 has been chosen to be connected.

The measuring rake 1 as described above has numerous advantages. In particular:

- it makes it possible to obtain a simple and inexpensive measuring tool which builds up no or very few electrostatic charges on the conductive layer 37;
- it makes it possible to obtain an electrical connection at all times between the conductive layer 37 and a conductive element of the engine 2;
- it makes it possible to avoid the manifestation of undesirable electrostatic charges;
- it makes it possible to avoid measuring and/or data communications problems caused by electrostatic discharges; and
- it can be adapted easily to various configurations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pressure measuring rake configured to be arranged on a link rod, said pressure measuring rake comprising at least:

- a sheath comprising two side walls which between them delimit a recess configured to receive the link rod;
- an electronic circuit arranged on the sheath and comprising at least one sensor; and
- at least one conductive layer at least partially covering the sheath, said at least one conductive layer being intended to be electrically connected to at least one conductive element configured to drain off charges that are liable to build up on the at least one conductive layer;
- a patched leading edge removably fixed to the sheath via a counter-plate arranged in the recess, said patched leading edge and said counter-plate being arranged on either side of a front wall of the sheath and fixed to said sheath together by fixing elements so as to both being electrically connected to the at least one conductive layer, a conductive strip fixed, at a fixing end thereof, to the counter-plate.

2. The pressure measuring rake according to claim 1, wherein the at least one conductive layer corresponds to a conductive paint layer painted on at least some of the sheath.

3. The pressure measuring rake according to claim 1, wherein the at least one conductive layer comprises at least one antistatic agent based on one of the following chemical elements: copper, carbon, nickel, silver, silicates, indium.

4. The pressure measuring rake according to claim 1, wherein the conductive strip is configured to electrically connect the conductive layer at all times to at least one conductive element.

5. The pressure measuring rake according to claim 4, wherein the fixing end of the conductive strip is fixed in the recess in the sheath in contact with the at least one conductive layer and the conductive strip has a free end protruding from the recess at one longitudinal end of the sheath, the free end being intended to electrically connect the at least one conductive layer at all times to the at least one conductive element by being pressed against said at least one conductive element at all times.

6. The pressure measuring rake according to claim 5, wherein the conductive strip has a stiffness and an arrangement configured to generate an elastic force against the at least one conductive element at the free end at all times, said elastic force being able to keep said free end in contact with said at least one conductive element so as to electrically connect the at least one conductive layer at all times to said at least one conductive element.

7. The pressure measuring rake according to claim 1, further comprising at least one data processing unit configured to receive data measured by the sensors of the electronic circuit, said data processing unit being arranged on the sheath or separate.

8. An engine for an aircraft, said engine comprising:

- a secondary duct and at least one movable reverser door, said reverser door comprising at least one link rod fixed in articulated fashion between the reverser door and a motor, said link rod being configured to make it possible to bring the reverser door into a retracted position, in which it is not across the secondary duct, and into a deployed position, in which it is across the secondary duct, and
- at least one measuring rake according to claim 1, arranged on at least one link rod of the engine, said at least one link rod each being accommodated in the recess of at least one measuring rake.

9. An aircraft comprising at least one engine according to claim 8.

10. A pressure measuring rake configured to be arranged on a link rod, said pressure measuring rake comprising at least:

- a sheath comprising two side walls which between them delimit a recess configured to receive the link rod;

an electronic circuit arranged on the sheath and comprising at least one sensor, and at least one conductive layer at least partially covering the sheath, said at least one conductive layer being intended to be electrically connected to at least one conductive element configured to drain off charges that are liable to build up on the at least one conductive layer; and at least one conductive strip configured to electrically connect the at least one conductive layer at all times to at least one conductive element, wherein the at least one conductive strip has a fixing end fixed in the recess in the sheath in contact with the at least one conductive layer and a free end protruding from the recess at one longitudinal end of the sheath, the free end being intended to electrically connect the at least one conductive layer at all times to the at least one conductive element by being pressed against said at least one conductive element at all times, the pressure measuring rake further comprising:

a patched leading edge removably fixed to the sheath via a counter-plate arranged in the recess, said patched leading edge and said counter-plate being arranged on either side of a front wall of the sheath and fixed to said sheath together by fixing elements so as to both being electrically connected to the at least one conductive layer, the at least one conductive strip being fixed, at the fixing end thereof, to the counter-plate.

* * * * *